United States Patent [19]

LaBelle et al.

[11] 4,303,327
[45] Dec. 1, 1981

[54] FILM CASSETTE WITH PRESSURE PLATE ASSEMBLY LATCHING SYSTEM

[75] Inventors: Theodore J. LaBelle, Dorchester; Duncan C. Sorli, Chelmsford, both of Mass.

[73] Assignee: Polaroid Corporation, Cambridge, Mass.

[21] Appl. No.: 203,124

[22] Filed: Nov. 3, 1980

[51] Int. Cl.³ .................... G03B 17/26; G03B 41/18
[52] U.S. Cl. .................................... 354/276; 250/480
[58] Field of Search ................ 250/468, 477, 480; 354/276, 281

[56] References Cited

U.S. PATENT DOCUMENTS

| | | | |
|---|---|---|---|
| 2,878,389 | 3/1959 | Raffman | 250/480 X |
| 3,233,101 | 2/1966 | Forsyth | 250/480 X |
| 3,364,835 | 1/1968 | Brackett et al. | 250/468 X |
| 3,371,208 | 2/1968 | Brackett et al. | 250/477 |
| 3,383,507 | 5/1968 | Brackett et al. | 250/477 |
| 4,019,194 | 4/1977 | Cutler et al. | 354/312 |
| 4,156,568 | 5/1979 | Erikson | 354/312 |
| 4,186,308 | 1/1980 | Erikson | 250/480 |
| 4,200,384 | 4/1980 | Josephson et al. | 354/304 |

*Primary Examiner*—Donald A. Griffin
*Attorney, Agent, or Firm*—John S. Vale

[57] ABSTRACT

A cassette for releasably holding a film unit and locating it at an exposure position therein. The cassette includes base and cover sections locatable in a closed position wherein a pressure plate assembly on the cover section is movable toward and away from the base section between a raised film release position and a lowered pressure applying position wherein the film is pressed between opposed bearing surfaces, one of which may be formed by an intensifying screen for x-ray applications, within the cassette to locate the film unit at the exposure position. A simply-constructed, low-cost pressure plate assembly latching system is provided including a pair of latch members having latch tabs thereon which are captured in corresponding detents on the pressure plate assembly to releasably hold the latch members in a cocked unlatching position. In response to movement of the pressure plate assembly to the lowered position, the tabs are released from the detents and the latch members move forwardly automatically to the latching position wherein the tabs engagingly overlie the exterior surface of the pressure plate assembly to hold it in the lowered position.

9 Claims, 9 Drawing Figures

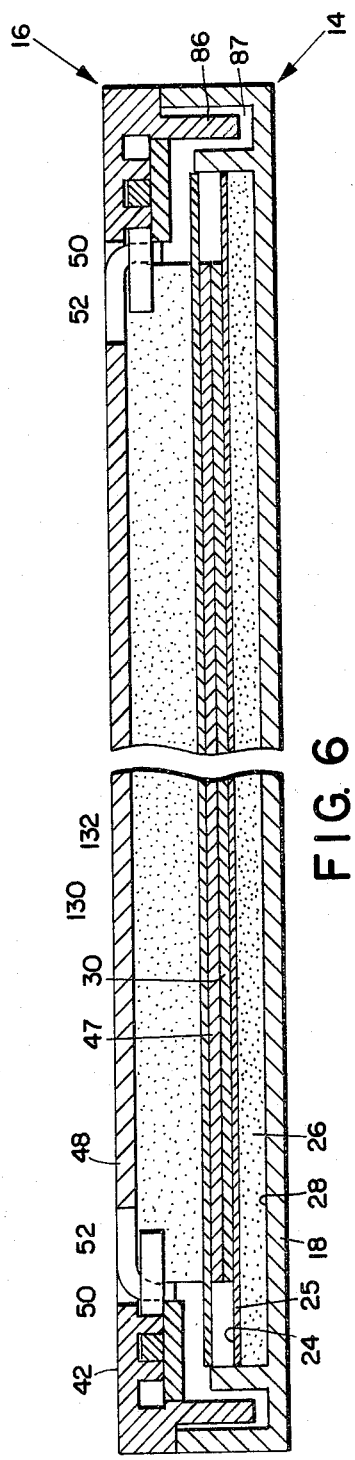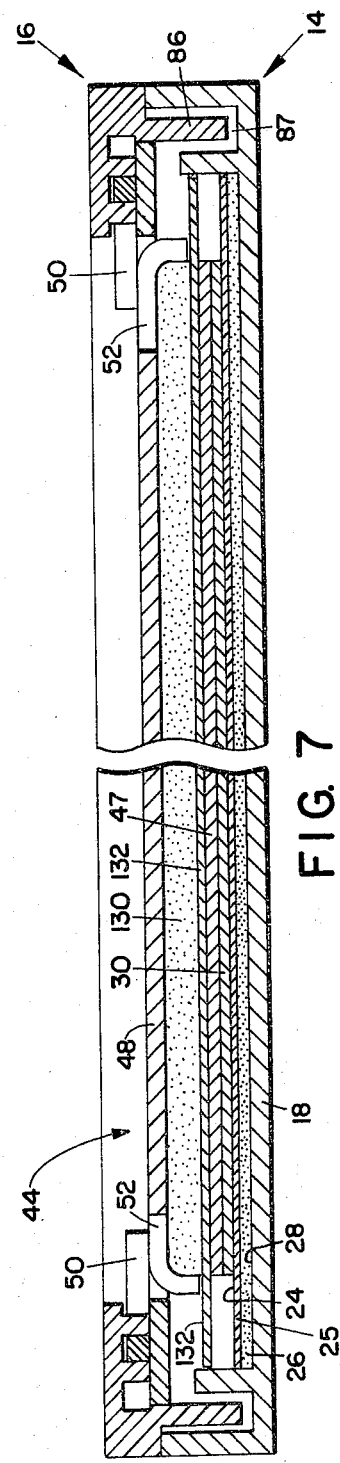

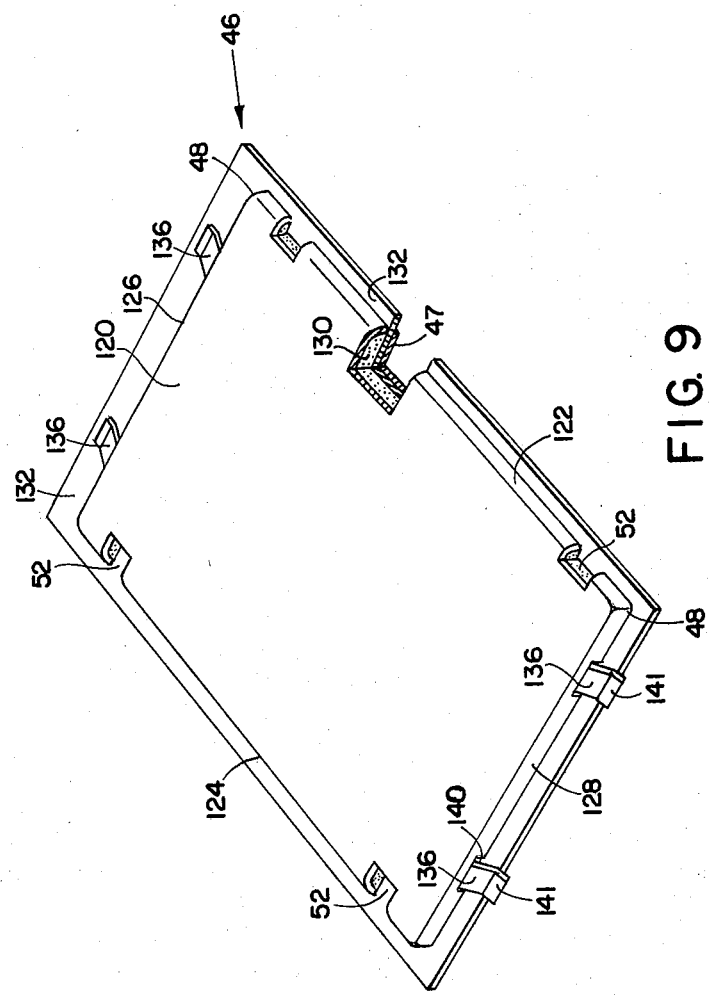

FILM CASSETTE WITH PRESSURE PLATE ASSEMBLY LATCHING SYSTEM

BACKGROUND OF THE INVENTION

The present invention relates to the field of photography and, more particularly, to a cassette for releasably holding a film unit and for locating the film unit at an exposure position therein in preparation for exposure.

The cassette embodying the present invention is particularly well suited for use with a large format, e.g. 8×10 or larger, film unit that forms a separate "negative" component of a self-developing film assemblage which also includes a "positive" component comprising an image receiving sheet having a rupturable container of fluid processing composition at one end thereof.

In the illustrated embodiment, the cassette is designed for X-ray applications and includes an interior bearing surface against which one side of the film unit is to bear in intimate contact, and an intensifying screen that is adapted to be urged into intimate contact with the opposite photosensitive side of the film unit to enhance image formation when the intensifying screen emits visible light in response to impingement of X-ray radiation thereupon. Provisions are also made for daylight loading of the film unit which is initially provided with an opaque envelope covering the photosensitive portion thereof for protection from ambient light until the film unit is safely located within the light excluding environment of the cassette housing.

Cassettes of this type generally include some type of mechanism for selectively applying pressure to the film unit in a direction transverse to the exposure plane to urge it into good contact with the intensifying screen. After the film unit is initially loaded into the cassette, it is desirable that this pressure be at a minimum so that the opaque envelope may be easily withdrawn through a light seal passageway at one end of the cassette. However, before the cassette is mounted on an appropriate apparatus for film exposure, increased pressure is applied to the film units so that one side thereof is urged into intimate contact with the film bearing surface while the intensifying screen is urged into intimate contact with the opposite side thereof.

Following exposure, it is desirable to once again minimize this pressure to facilitate the advancement of the exposed film unit through a light sealed passageway at the opposite end of the cassette so that it may be advanced into a processor in superposition with the image receiving sheet. Within the processor the superposed sheets are advanced between a pair of pressure applying rollers for releasing the fluid from the rupturable container and distributing it between the negative and positive sheets to initiate a well-known development and diffusion transfer process.

Commonly-assigned U.S. Pat. Nos. 4,200,384 and 4,156,568; and copending application U.S. Ser. No. 108,453, filed Dec. 31, 1979 and now U.S. Pat. No. 4,249,818 issued Feb. 10, 1981, disclose a variety of cassette receiving trays that are mountable on a commercially available large format film processor of the type described in commonly-assigned U.S. Pat. No. 4,019,194 and marketed by Polaroid Corporation, Cambridge, Mass.

This type of tray holds a positive sheet in alignment with the processor entry way. As the cassette is slidably inserted into the tray over the positive sheet, a mechanism therein guides a leader tab on the negative through a receiving slot on the positive leader to couple the sheets together for advancement between the rollers. The trays disclosed in the last two-mentioned tray patents are configured for use with X-ray cassettes (of the type more fully described in commonly-assigned U.S. Pat. No. 4,186,308 and copending application U.S. Ser. No. 108,457 filed on Dec. 31, 1979 and now U.S. Pat. No. 4,258,263 issued Mar. 24, 1981) and include mechanisms for automatically releasing a pressure plate assembly mounting the intensifying screen in response to locating the cassette at a fully-inserted position on the tray.

Another type of large format processing system is shown in commonly-assigned U.S. Pat. No. 3,364,835 wherein the cassette (described in more detail in commonly-assigned U.S. Pat. Nos. 3,371,208; and 3,383,507) initially holds both the positive and negative sheet of a self-developing X-ray film unit. Upon introducing the cassette into a processor, latch buttons on the side of the cassette are automatically actuated to release the latched cover section and relieve the pressure applied to the film unit by the intensifying screen thereby facilitating film withdrawal.

In order to maximize the convenience of using such a cassette and also simplify film processing operations, it should have certain characteristics. These include ease of loading a film unit into the cassette and removing the opaque envelope; the ability to easily move the intensifying screen into the pressure applying position and insure that it is reliably latched thereat with minimal manipulation by the operator; and compatibility with one or more of the above-mentioned trays to trigger the automatic release of the pressure urging the intensifying screen into contact with the film to facilitate removal. Also, the pressure latching system should be simple in its construction in the interest of reliability of operation and low manufacturing costs.

While the above-noted cassettes perform their intended functions satisfactorily, their mechanisms for releasably latching a pressure plate assembly mounting the intensifying screen in the lowered pressure applying position tend to be rather complex mechanically thereby resulting in relatively high manufacturing and assembly costs.

For example, the cassette disclosed in the previously-noted U.S. Pat. Nos. 3,371,208; and 3,383,507 include a pair of latching assemblies mounted in hollow side wall portions of the base section for sliding movement between latching and unlatching positions. The latching assemblies are normally spring biased into their latching positions. As the cassette cover section, which serves as a pressure plate for urging the intensifying screen into intimate contact with the film unit, is pivoted downwardly toward its closed position, latch tabs thereon engage angled cam surfaces on the latching assemblies and drive them rearwardly toward the unlatching position. When the latching assemblies are fully retracted, the latch tabs clear the bottom edge of the cam surfaces and the latching assemblies move forward over the tabs to their latching position.

Because the latching assemblies are initially located in the latching position, it is necessary to provide the camming structure to initially retract or cock the latching assemblies in preparation for their latching operation. The provision of the angled cam surface is an additional expense which does not contribute to the latching or unlatching function but rather is required to retract the latch assemblies in preparation for the latching operation. For any camming device to work properly, it must be carefully designed and then precisely located in the cassette with respect to the latch tabs to insure proper and reliable operation. Such required precision, of course, adds to the cost of manufacture. Also, because the latch assemblies engage the tabs deep within a recess formed in the side wall assemblies, the operator does not have a clear view of the latching operation and must depend on an audible click to assure him that the latching assemblies have indeed moved forwardly to the latching position.

The cassette disclosed in the previously-noted U.S. Pat. No. 4,186,308 utilizes movable cam members which interact with camming surfaces in the base section for moving the intensifying screen between its raised film release position and its lowered pressure applying position. Again, there is a high degree precision required for this mechanism to operate properly and therefore it is relatively costly to manufacture and assemble.

Likewise, the cassette described in copending application U.S. Ser. No. 108,457 utilizes six individual spring-biased latching members and corresponding camming structures for selectively effecting movement of the latching members between the latching and unlatching positions.

Therefore, it is an object of the present invention to provide a cassette of the general type described which is easy to use and simplified in its construction in the interest of reducing manufacturing costs.

It is another object to provide such a cassette that includes a latching system for releasably latching the pressure plate assembly in the pressure applying position which does not require expensive camming surfaces in its construction.

It is yet another object to provide such a cassette wherein the latching elements are visible to the operator so that he may easily ascertain that the pressure plate is securely latched.

Another object is to provide such a cassette which is compatible with a processing system wherein the pressure plate assembly latches are automatically released in response to inserting the cassette into a cassette receiving tray which also supports a positive image receiving sheet of a self-developing film assemblage.

Other objects of the invention will, in part, be obvious and will, in part, appear hereinafter.

SUMMARY OF THE INVENTION

The present invention provides a low cost and simply constructed cassette for releasably holding a film unit and for locating it at an exposure position therein.

In its construction, the cassette includes a base section having a bottom wall portion including a first interior film bearing surface; and a cover section. The cover section includes a top wall portion having an aperture therein and is locatable in a closed position over the base section wherein the top wall portion is spaced a fixed distance from the first bearing surface and the aperture is in registration therewith. In the closed position, the base and cover sections also cooperate to define a light seal film withdrawal opening at one end of the cassette.

Mounted on the cover section, within and in covering relation to the aperture, is a pressure plate assembly which includes an exterior surface and a second interior film bearing surface. The pressure plate assembly is arranged on the cover section with the second bearing surface facing the first bearing surface and is movable toward and away from the base section between a raised film release position wherein the facing bearing surfaces exert minimal pressure on the film unit therebetween to facilitate its withdrawal and a lowered pressure applying position wherein the second bearing surface is closer to the first bearing surface, than in the raised position, and they cooperate to apply a greater pressure to the film unit to locate it at the exposure position. In the illustrated embodiment, the cassette is intended for X-ray applications and the second interior surface is formed by an intensifying screen on the interior side of the pressure plate assembly. Also, the pressure plate assembly is spring biased toward its raised position.

The cassette additionally includes structure for releasably latching the pressure plate assembly in the lowered position comprising a pair of latch members mounted for movement between latching and unlatching positions. The latch members are spring biased toward their respective latching positions.

Cooperating with the latchd members are means on the pressure plate assembly for (1) releasably holding the latching members in the unlatching position against the bias of the latch member biasing spring when the pressure plate is in the raised position; (2) for releasing the latch members for automatic movement to their latching positions in response to movement of the pressure plate assembly to the lowered position; and (3) thereafter responsive to movement of the latch members back to their unlatching positions and the automatic movement of the pressure plate assembly back to its raised position caused thereby for again releasably holding the latch members in their unlatching positions.

In the illustrated embodiment, the latch members are formed as elongated elements having integrally formed offset portions or tabs which extend into the aperture on the cover section. When the pressure plate assembly is raised, the tabs are captured in detents therein. In response to moving the assembly to the lowered position, the tabs clear the detents and the latch members move forwardly so that the tabs engagingly overlie the exterior surface of the pressure plate assembly to releasably latch it in its lowered position. When the latching members are moved rearwardly, such as in response to sliding the cassette into a processor tray, to the unlatching positions, the tabs become registered with detents in the pressure plate which allow the pressure plate assembly to automatically move to its raised position. The detents then once again capture the tab to releasably hold the latching members in their respective unlatching positions in preparation for their next latching operation.

Because the tabs act directly against the exterior surface of the pressure plate assembly, they are easily visible by the operator so that he may ascertain that the pressure plate is properly latched in the pressure applying position or is fully released for movement to the raised position.

As will become apparent from the following description, the pressure plate assembly latching system does not require the use of camming structure and therefore is relatively inexpensive to manufacture. Also, cost savings are realized by providing a single spring for biasing both latch members toward their latching position rather than utilizing independent springs for each which is common in the prior art.

Other objects of the invention will, in part, be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 6 is a cross-sectional view of the cassette of FIG. 2 taken along the line 6—6;

FIG. 7 is a cross-sectional view of the cassette shown in FIG. 3 taken along line 7—7;

FIG. 9 is a perspective view of the pressure plate assembly.

DESCRIPTION OF THE PREFERRED EMBODIMENT

Figure 1:
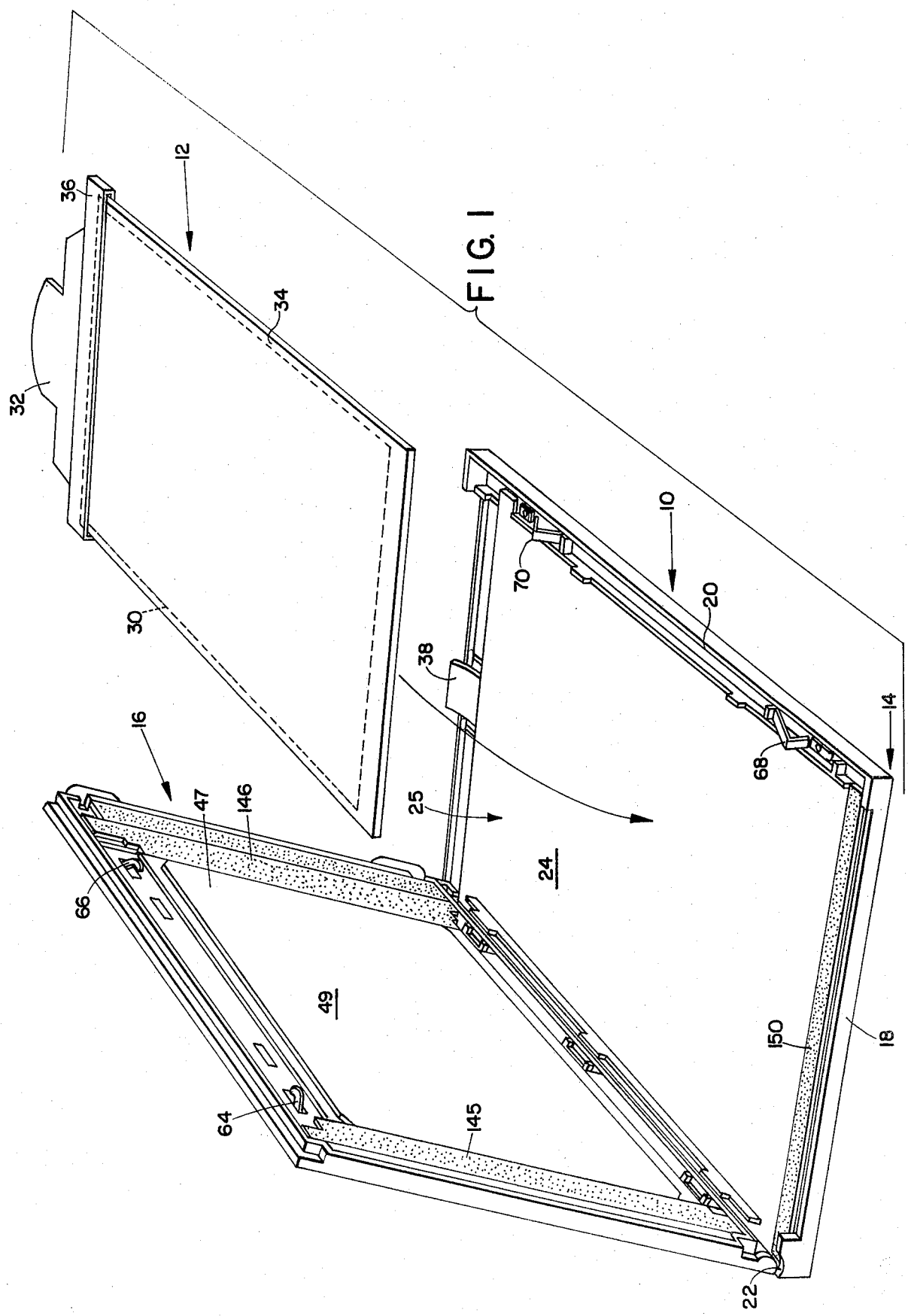
FIG. 1 is a perspective view of a cassette embodying the instant invention, shown in its open position, and a film unit for use therewith.

Referring to FIG. 1, the present invention provides a cassette 10 for releasably holding a film unit 12 and locating it at an exposure position therein.

Figure 2:
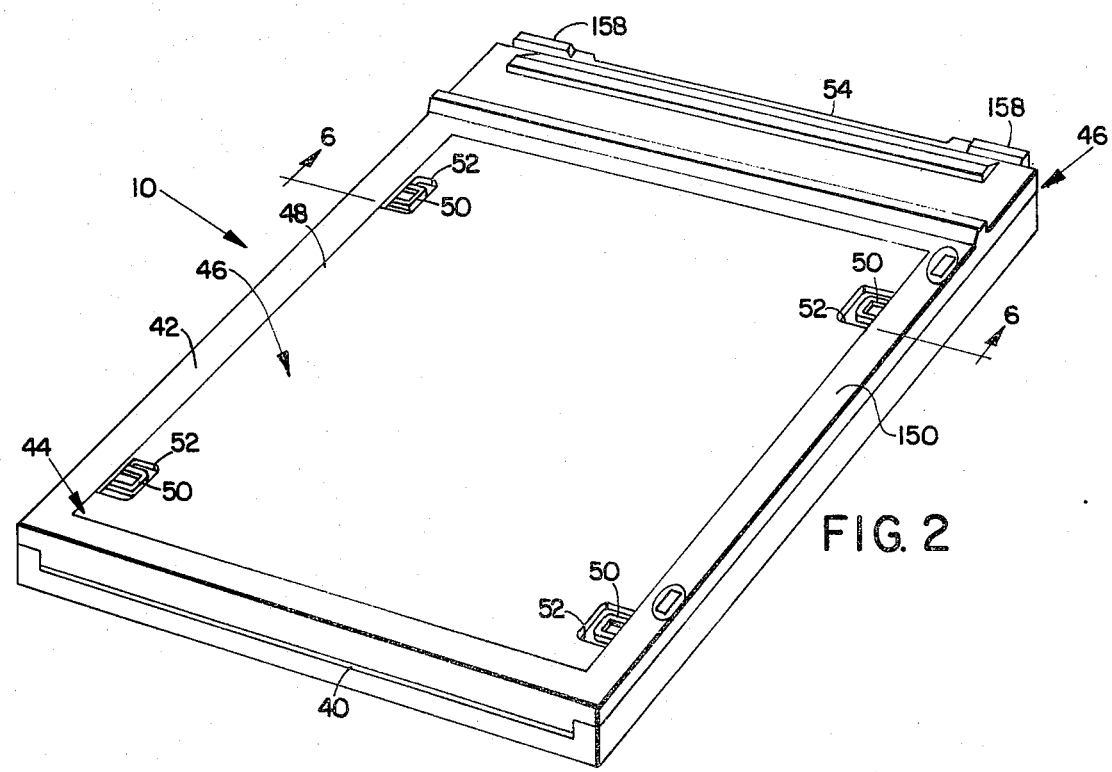
FIG. 2 is a perspective view showing the cassette in its closed position with a pressure plate assembly on the cover section in its raised film release position.
Figure 3:
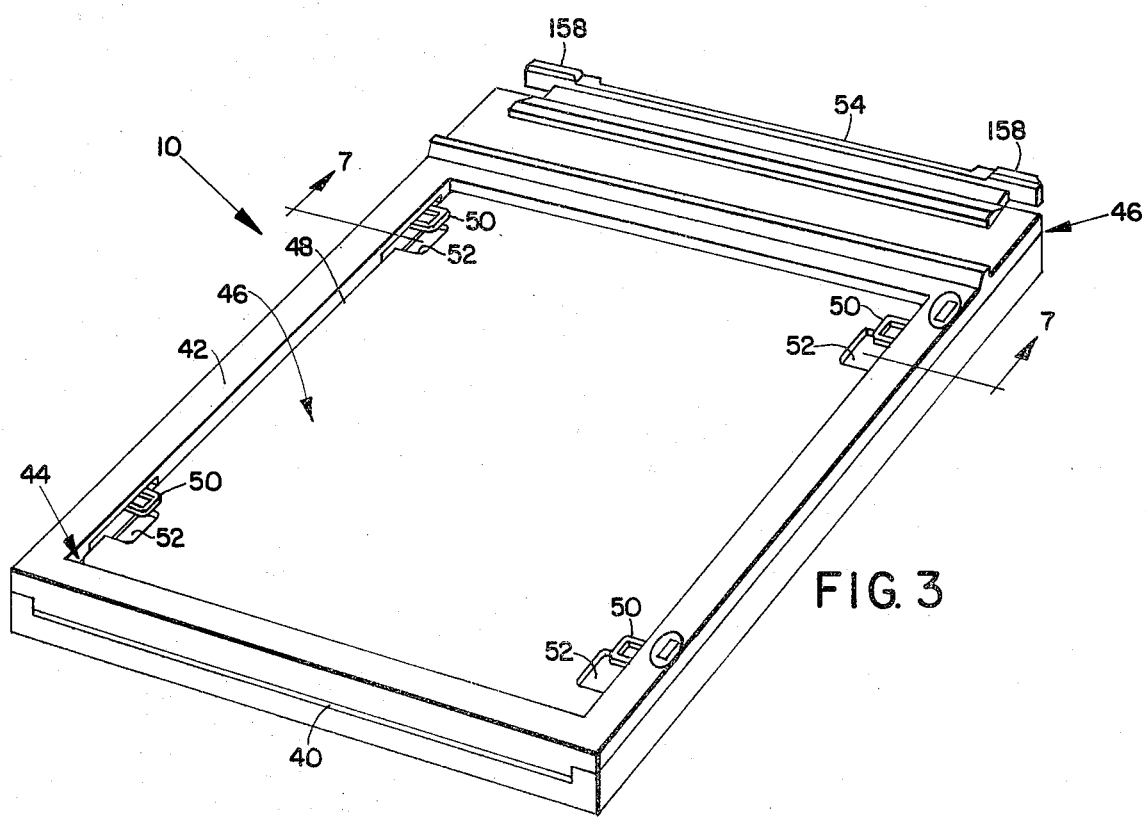
FIG. 3 is a perspective view of the cassette shown in FIG. 2 with the pressure plate releasably latched in its lowered pressure applying position.

Cassette 10 is of the book opening type and includes a base section 14 and a cover section 16 hinged together along one lateral edge portion of the cassette for movement between the open position of FIG. 1 and the closed position of FIGS. 2 and 3.

In the illustrated embodiment, cassette 10 is adapted for X-ray applications and its generally rectangular base section 14 is formed of any suitable X-ray transparent material. It is especially well-suited for molded plastic construction.

The generally planar bottom wall portion 18 extends laterally between a first side wall portion 20 and a second side wall portion 22 where base section 14 is hinged to cover section 16. On the interior of the bottom wall portion 18 is a generally flat upwardly facing first interior bearing surface 24 against which one side of the photosensitive portion of film unit 12 is adapted to bear in intimate contact to locate it at the exposure position. In the illustrated embodiment, surface 24 is formed by a light opaque Mylar cover sheet 25 positioned over a thin resilient foam pad 26 mounted on interior surface 28 of bottom wall section 18 as best shown in FIGS. 6 and 7.

The film unit 12 serves as the "negative" component of a self-developing film assemblage which also includes a "positive" component comprising an image receiving sheet having a rupturable container of fluid processing composition secured to the leading end thereof. Film unit 12 comprises a rectangular base sheet 30 having one or more photosensitive layers thereon, a film manipulation tab 32 secured to the leading end of sheet 30, and a light opaque envelope 34 which protectively covers photosensitive sheet 30 from ambient illumination and has its leading open end slidably inserted into a retaining cap 36 on leader 32.

Film unit 12 is placed on bearing surface 24 and moved rearwardly so that a rigid retaining tab 38, mounted on bottom wall portion 18 at the leading end of cassette 10, slides between cap 36 and the leading end of envelope 34. Tab 38 serves to prevent longitudinal movement of the film unit when the envelope 34 is withdrawn from the cassette through a light sealed opening 40 at the trailing end of the cassette which the base and cover sections cooperatively defined when cover section 16 is located in the closed position of FIGS. 2 and 3.

The cover section 16 includes a planar top wall portion 42 (forming part of a later-to-be-described component support frame) having a generally rectangular aperture 44 therein and being locatable in the closed position over base section 14 wherein the top wall portion 42 is spaced at a fixed distance from the first bearing surface 24 and the aperture 44 is in registration therewith, and wherein the base and cover sections also cooperate to define a light sealed film withdrawal opening 46 at the leading end of cassette 10.

Mounted on cover section 16, within and in covering relation to aperture 44, is a pressure plate assembly 46 which includes on its outer side a rigid pressure plate 48 and on its interior side (see FIG. 1) an intensifying screen 47 having an underside surface 49 which forms a second film bearing surface in cassette 10 in opposed relation to surface 24.

In FIG. 2, a pressure plate assembly 46 is shown in its fully raised film release position wherein there is sufficient spacing between surfaces 24 and 49 so that they exert minimal pressure on the film unit 12 to facilitate withdrawal of opaque envelope 34 through withdrawal opening 40. As will be describe later in detail, on each lateral side of cover section 16 a pair of latch tabs 50 extend into aperture 44 where they are received in corresponding detents or notches 52 formed in the pressure plate 48. The tabs 50 are integrally formed with sliding latch members on each side of the cassette which are spring biased forwardly toward their latching positions. When assembly 46 is in its raised position, detents 52 capture tabs 50 and releasably hold the latch members in their cocked unlatching position against the force of the biasing spring.

Once envelope 34 is withdrawn, the operator manually moves pressure plate assembly 46 to its lowered pressure applying position by manually pushing downwardly on the exterior surface of pressure plate 48. In response to this downward movement, the tabs 50 clear the recessed detents 52 allowing the latch members to slide forwardly under the urging of the biasing spring to the latching position shown in FIG. 3 where their corresponding tabs 50 engagingly overlie the exterior or top surface of pressure plate 48, just forwardly of their corresponding notches 52, to releasably hold it down. In the pressure applying position, photosensitive sheet 30 is pressed between surfaces 24 and 49 to locate it at the exposure position and insure that the photosensitive side thereof is in intimate contact with surface 49 to the intensifying screen 47.

Cassette 10 is then loaded into any conventional X-ray apparatus where the film is exposed to light generated in response to X-ray radiation penetrating the base section 18 and impinging upon intensifying screen 52.

It will be noted that when the latch members move to their forward latching position a transverse latch release bar 54, coupling the ends of the latch members together at the leading end of the cassette, moves forwardly with the latch members to an extended position. When bar 54 is moved rearwardly, it, in turn, moves the latch members rearwardly against the bias thereon so that the tabs 50 move rearwardly and become registered with their corresponding notches 52. At this point, the pressure plate assembly 46 automatically moves upwardly to its raised position, under the influence of later-to-be-described biasing means, and pressure plate 48 once again captures the tabs 50 in detents 52 to releasably lock the latch members in their cocked unlatching position.

Figure 8:
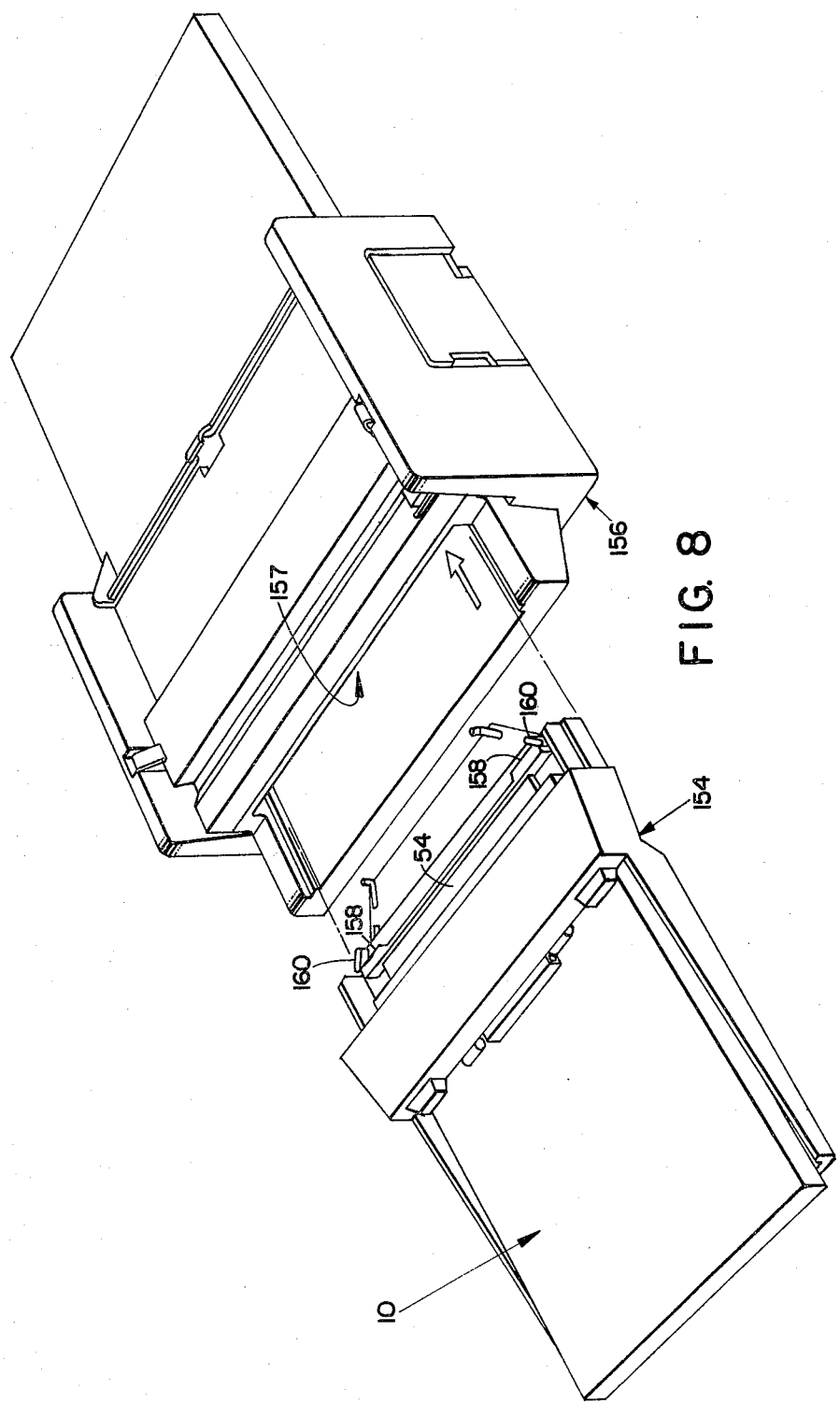
FIG. 8 shows the cassette in a receiving tray having structure thereon for automatically releasing the cassette pressure plate assembly latch members, and a large format film processor on which the tray is adapted to be mounted.

To process the film unit 12, cassette 10 is preferably loaded into a cassette receiving tray mounted on a large format film processor which includes a pair of motor driven pressure applying rollers therein. Such a system is shown in detail in commonly-assigned U.S. Pat. No. 4,200,384 and certain of its aspects will be described later with reference to FIG. 8.

In this instance, the cassette may be loaded into the receiving tray with the pressure plate assembly 46 left in the lowered pressure applying position. The tray holds a positive sheet therein aligned with the entry opening of the processor. As the cassette is slidably inserted into the tray over the positive sheet, leader 32 is automatically threaded into coupled relation with a corresponding leader on the positive sheet. As the cassette approaches its fully inserted position, release bar 54 engages a pair of stop members at the leading end of the tray so that, in response to further movement into the tray, release bar 54 is retracted and the latch members are automatically released. With the pressure applying assembly 46 at its raised position, pressure on photosensitive sheet 30 is at a minimum and it may be easily withdrawn from cassette 10 when the leaders are advanced into the bite of the pressure applying rollers. As the superposed sheets advance between the rollers a fluid processing composition is released from the rupturable pod and is distributed therebetween to initiate a well-known development and diffusion transfer process.

For a detailed description of the structural and chemical composition of self-developing film assemblages suitable for use with cassette 10, reference may be had to commonly-assigned U.S. Pat. Nos. 2,983,606; 2,554,268; 2,565,378; 2,698,236; 2,298,237; and 2,698,245.

Figure 4:
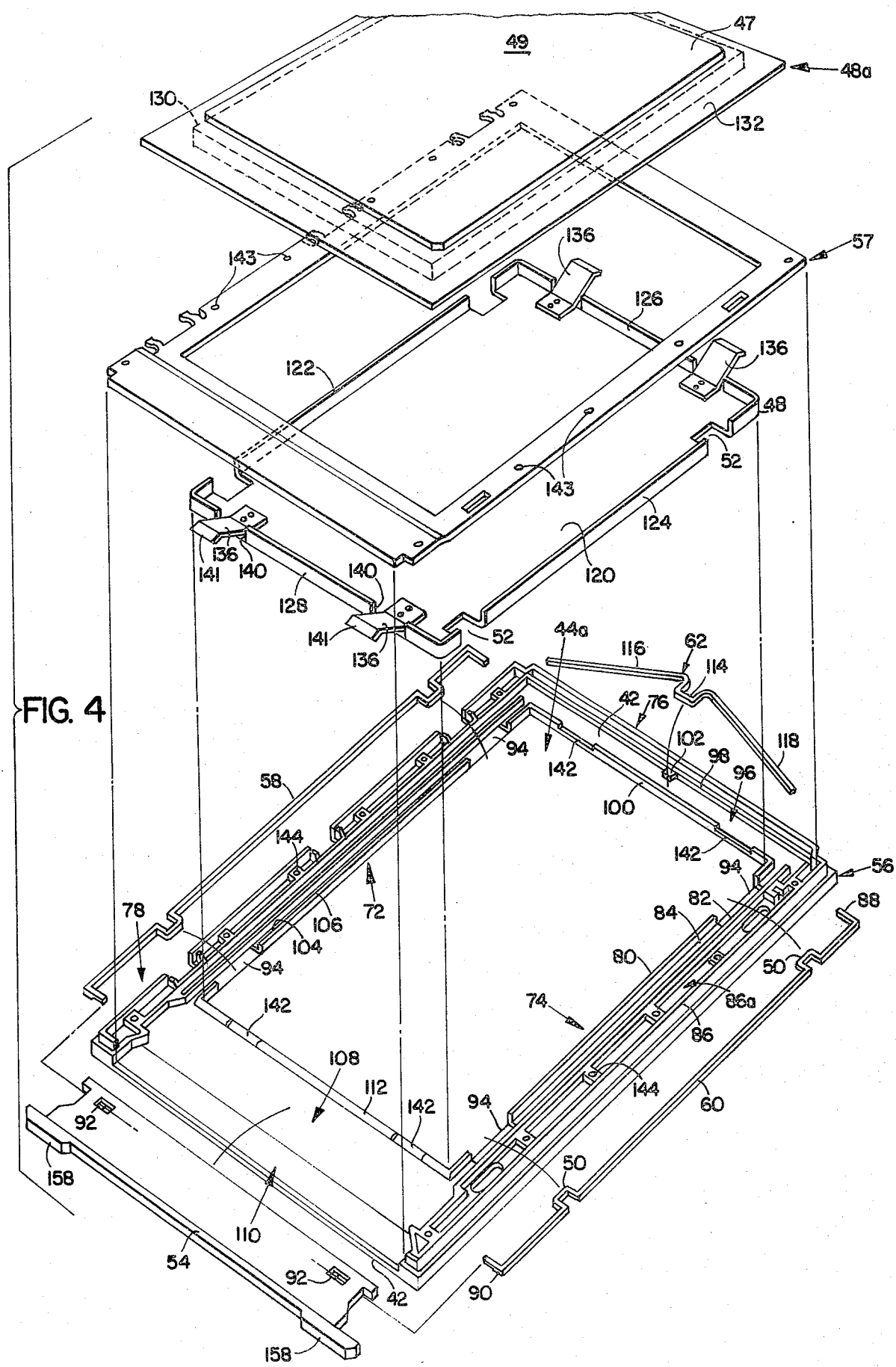
FIG. 4 is a perspective view, shown in exploded fashion, of the cover section of the cassette showing its various components.

As best shown in FIG. 4, the major components of cover section 16 include a component support frame 56 formed in part by top wall portion 42; the pressure plate assembly 46 formed by pressure plate 48 and a subassembly 48a which includes intensifying screen 47; and an interior component retainer frame 57.

Functionally, frame 56 receives and supports the pressure plate assembly 46 and components of the pressure plate assembly latching system which include a pair of elongated latch members 58 and 60; a single latch member biasing spring 62; and the previously-noted latch release bar 54. Although not shown in this drawing for the sake of visual clarity, frame 56 also supports components of a pair of cassette latching members 64 and 66 which cooperate with complementary latching members 68 and 70 mounted on base section side wall portion 20 (see FIG. 1) for releasably latching the base and cover sections together in the closed position.

Structurally, support frame 56 is generally rectangular in shape and has a central rectangular opening 44a therein. In a preferred embodiment, frame 56 is of molded plastic construction and includes a pair of opposed laterally spaced side wall portions 72 and 74 joined together by top wall portion 42 at their trailing ends to define trailing end section 76 and at their leading ends to define end section 78.

Side wall portion 74 includes a pair of longitudinally extending walls 80 and 82 integrally formed and standing up from the interior side of top wall portion 42 of frame 56 and spaced apart from each other to define a guide channel 84 therebetween for receiving latch member 60.

Spaced from wall 84 is a taller parallel wall 86 creating a channel 86a for receiving components of latches 64 and 66. When the cassette is closed, wall 86 extends into a corresponding channel 87 (see FIG. 6) formed in base section side wall portion 20 to form a labyrinth-type light seal along the side of the cassette.

Latch member 60 is preferably stamped from metal bar stock material to include the integrally formed pair of inwardly offset latch tabs 50, an inwardly turned right-angle trailing end section 88 which will be engaged by biasing spring 62 and an inwardly turned leading end section 90 which will be captured in a slotted opening 92 in release bar 54 for coupling the leading end of latch member 60 thereto.

Figure 5:
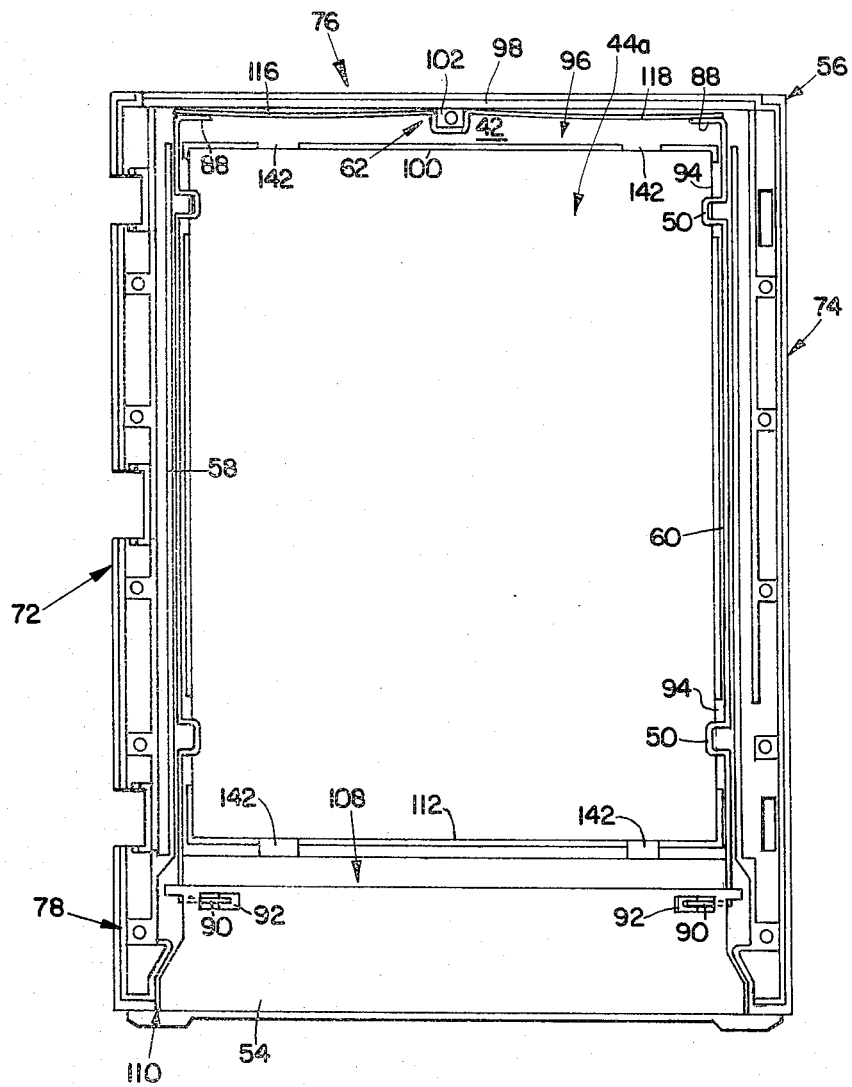
FIG. 5 is an interior plan view of the cover section having its inside retaining plate removed to show the components of a pressure plate assembly latching system in their operative positions.

With latch member 60 seated in channel 86 as shown in FIG. 5., the tabs 50 extend inwardly into aperture 44a through a pair of corresponding elongated notches 94 provided in upstanding wall 80 thereby allowing latch member 60 to slide longitudinally in channel 86 between its latching and unlatching positions.

The trailing end right-angle section or arm 88 extends inwardly from side wall portion 74 into a longitudinally extending channel 96 on trailing end section 76 formed by the inside of top wall 42 and two integrally formed upstanding spaced walls, 98, formed at the trailing end of frame 56, and 100 bordering aperture 44a.

Integrally formed in channel 96 in abutting relation to the center portion of wall 98 is a spring positioning block 102 for stabilizing the lateral position of springs 62.

The other latch member 58 is formed in a complementary manner to latch member 60 and otherwise is of the same type of construction. A corresponding longitudinally extending guide channel 104 is provided in a support frame side wall portion 72 so that latch tabs 50 extend into aperture 44a through corresponding elongated notches 94 in the upstanding wall 106 bordering aperture 44a. Similarly, the trailing end arm 88 of latch member 58 extends laterally into channel 96 and its forward in-turned arm 90 is captured in the corresponding aperture 92 adjacent the left end of release bar 54 as viewed in FIGS. 4 and 5.

Release bar 54 is seated in a complementary well-like structure 108 on leading end section 78 for movement with the latch members 58 and 60 between the retracted unlatching position of FIGS. 2 and 5 and the extended latching position of FIG. 3. The release bar receiving well 108 has a leading end opening 110 and extends rearwardly therefrom to a laterally extending wall 112 which is formed in upstanding bordering relation to aperture 44a where it joins the leading ends of walls 106 and 74.

The latch member biasing spring 62 is preferably formed of a bar stock spring material and includes a generally U-shaped center section 114 whose legs turn outwardly and forwardly to define a pair of symmetrical spring arms 116 and 118. Spring 62 is placed into channel 96 so that U-shaped section 114 stradles positioning block 102 to stabilize the lateral position of spring 62. When so located, the free ends of spring arms 116 and 118 are positioned behind and respectively engage the arm sections 88 of the latch members 58 and 60 thereby providing a forwardly directed biasing force to urge both latch members simultaneously towards their respective latching positions.

It should be noted at this point that the pressure plate latching and unlatching system comprising latch members 58 and 60, biasing spring 62 and release bar 54 is very simply constructed and may be assembled merely by placing the component parts in their corresponding receiving channels in support frame 56 and connecting the leading end arms 90 to bar 54. Those skilled in the art will appreciate that such construction will substantially reduce manufacturing and assembly costs.

As best shown in FIGS. 4 and 9, the pressure plate assembly 46 includes the substantially rigid generally rectangular pressure plate 48 which includes a planar top wall 120 and a peripheral section depending from the edges thereof including a pair of opposed lateral side walls 122 and 124, a trailing end wall 126 and a leading end wall 128.

The subassembly 48a includes a resilient foam pad 130 which will be bonded to the interior surface to top wall 120 by any suitable means such as an adhesive. Attached to the underside of pad 130 is an opaque light-sealing sheet 132, preferably formed of Mylar, which extends outwardly beyond the peripheral section of pressure plate 48. Secured to the underside of light sealing sheet 132 is the intensifying screen 47, of the type which is well-known to those skilled in the art of X-ray photography, which is dimensioned to be coextensive and registered with pressure plate top wall 120 and pad 130.

The notches or detents 52 are cut into the sides of pressure plate 48 and extend through the side walls 122 and 124 and part way into the top wall 120. The foam pad 130 is appropriately notched at these locations to provide clearance for the latch member tabs 50.

Cassette 10 is provided with means for biasing the pressure plate assembly 46 upwardly towards its raised film release position shown in FIG. 2. In the illustrated embodiment, the pressure plate assembly biasing means take the form of two pair of leaf springs 136 coupled to pressure plate 48 with a pair of each at the leading and trailing ends. Each spring 136 has one end fixedly secured to the interior surface of top wall 120 and includes a depending leg portion which extends through a notch 140 provided in the appropriate end wall 126 or 128 and terminates in a horizontal foot portion 141.

When the pressure plate 48 is placed into the aperture 44a in support frame 56, the leading and trailing end springs 136 extend through corresponding notches 142 in walls 100 and 112 so that their horizontal foot portions 141 rest on the interior of wall 42 in channel 96 at the trailing end and in the rearward part of the release bar receiving well 108 at the forward end of frame 56.

The components of the pressure plate assembly latching system and the free ends of biasing springs 136 are retained in support frame 56 by the interior cover plate or retaining frame 57, which is a generally planar piece part having a rectangular aperture 44b therein which is aligned in registration with aperture 44a when frame 57 is secured to frame 56 in closing relation to its open peripheral section. Frame 57 may be secured by any appropriate means such as by screws (not shown) which pass through openings 143 along the side walls of frame 57 and are screwed into integrally molded receiving pads 144 provided in the side wall portions 72 and 74 of frame 56.

With retaining frame 57 in place, the subassembly 48a is attached to pressure plate 49. The foam pad 130 is inserted through aperture 44b and its facing surface is adhesively bonded to the interior surface of top wall 120. The oversize Mylar light sealing sheet mounting intensifying screen 47 remains on the exterior side of frame 57 and extends over the peripheral face thereof thereby providing a light seal for the space between the edges of pressure plate 48 and the frame structure defining aperture 44. When the subassembly 48a is so mounted, the completed pressure plate assembly 46 (see FIG. 9) is resiliently mounted on cover section 16 within and in closing relation to aperture 44 for movement toward and away from base section 14 between its raised and lowered positions. Additional light sealing may be provided by light sealing plush pile strips 145 and 146 which overlap opposite longitudinal ends of Mylar sheet 132 and the corresponding end portions of frame 57.

In use, cassette 10 is opened and the film unit 12 is placed on bearing surface 24 with the cap portion 36 in engagement with tab 38 as previously described. The cover section 16 is then pivoted to and releasably latched in the closed position of FIG. 2. Because the release bar 54 is pushed rearwardly, the latch members 58 and 60 are located in their cocked unlatching positions with tabs 50 captured in the aligned detents 52 of the pressure plate assembly 46 held in its raised film release position by the biasing forces provided thereon by springs 136. With assembly 46 raised, there is sufficient spacing between surface 24 and the interior surface 49 of intensifying screen 47 to apply only minimal pressure to the film unit 12 thereby facilitating the withdrawal of envelope 34 through the light seal trailing end opening 40. As best shown in FIG. 1, a strip of light sealing material 150 is provided across the trailing end of surface 24 so as to cooperate with light sealing strip 145 on cover section 16 to effect this seal.

Once envelope 34 is withdrawn, pressure plate assembly 46 is manually moved, by pressing downwardly on top wall 120 of pressure plate 48, to its lowered pressure applying position so that the photosensitive sheet 30 is pressed into intimate contact, on its opposite sides, with surface 24 and the underside surface 49 of intensifying screen 47. The pressure force is created in response to compression of the resilient pads 26 and 130 as best shown in FIG. 7. In response to this downward movement, the detents or notches 52 are lower than the latch tabs 50 allowing the latch members 58 and 60 to move forwardly under the influence of spring 62 to a latching position where tabs 50 engagingly overlie the exterior surface of top wall 120 just forwardly of the detents 52. This movement also extends release bar 54 to its forwardmost position. In this manner, the tabs 50 hold pressure plate assembly 46 in the lowered pressure applying position against the upward bias provided by springs 136 and the compressed foam pads 26 and 130.

The disposition of the internal components of the cassette are shown in cross-section when the pressure plate assembly 46 is in the raised film release position in FIG. 6 and in the lowered pressure applying position in FIG. 7.

The cassette is then transferred to any appropriate X-ray apparatus where the photosensitive sheet 30 is exposed by actinic radiation emanating from intensifying screen surface 52 in response to impingement of X-ray radiation thereon.

Following exposure, cassette 10 is then transferred to the receiving tray 154 mounted on a large format processor 156 of the type described in the previously-noted U.S. Pat. No. 4,200,384 and shown in FIG. 8.

Tray 154 holds a positive sheet (not shown) on a bottom wall therein so as to be in alignment with a processor entry way when tray 154 is mounted on processor 156 by inserting it into opening 157. As cassette 10 is slidably inserted into the tray 154 over the positive sheet, their respective leaders become coupled as described in detail in the aforementioned patent. When the cassette approaches its fully inserted position, the laterally spaced leading end portions 158 of the extended release bar 54 come into engagement with and are stopped by the upright stop members 160 at the leading end of tray 154. As cassette 10 is pushed further forwardly to assume its fully inserted position, release bar 54 is automatically retracted thereby driving the latch release members 58 and 60 rearwardly against the bias of spring 62 to the unlatching position of FIG. 2. Once the tabs 50 become registered with detents 52, pressure plate assembly 46 springs upwardly to relieve the pressure on the photosensitive sheet 30 and at the same time capture the tabs 50 in detents 52 to releasably latch the latch members 58 and 60 in their cocked unlatching position.

The disclosed pressure plate assembly latching system has several advantages over comparable systems known in the prior art. The latching system is simple in its construction and may be easily assembled by placing its component parts in support frame 56. It is low in cost in that it employs a single latch member biasing spring. More importantly, substantial cost savings are realized by eliminating the need for camming structure because the latch members are releasably held in the cocked unlatching position by the detents 52 on the raised pressure plate 48 and this system does not require camming structure to initially move them from the latching position to the cocked latching position in preparation for the pressure plate assembly latching operation. Also, the operator may be assured that the pressure plate assembly is securely latched or completely unlatched because the latch tabs 50 and detents 52 are fully visible.

While the cassette 10 described heretofore is configured for X-ray operations, those skilled in the art will appreciate that the pressure plate assembly latching system may be advantageously employed in cassettes configured to hold film adapted to be exposed in conventional large format cameras. In this case, the base section 14 would have a large rectangular exposure aperture therein which may be selectively blocked and unblocked by a conventional dark slide. The intensifying screen 47 would be eliminated and the light sealing sheet 132 would be urged into contact with the back surface of the film unit to thereby press the peripheral portion of the front side against the corresponding peripheral section of surface 24 surrounding the exposure aperture to locate the film unit in position for exposure.

Because certain changes may be made in the disclosed cassette 10, embodying the present invention, without departing from the scope of the invention herein involved, it is intended that all matter contained in the above description, the following claims, and shown in the accompanying drawings shall be interpreted as illustrative and not in a limiting sense.

What is claimed is:

1. A cassette for releasably holding a film unit and for locating it at an exposure position therein, said cassette comprising:

a base section having a bottom wall portion including a first interior film bearing surface;

a cover section, including a top wall portion having an aperture therein, being locatable in a closed position over said base section wherein said top wall portion is spaced a fixed distance from said first bearing surface and said aperture is in registration therewith, and wherein said base and cover sections cooperate to define a light sealed film withdrawal opening at one end of said cassette;

a pressure plate assembly, including an exterior surface and a second interior film bearing surface, mounted on said cover section within and in covering relation to said aperture with said second bearing surface facing said first bearing surface for movement toward and away from said base section between a raised film release position wherein said facing bearing surfaces exert minimal pressure on the film unit therebetween to facilitate its withdrawal and a lowered pressure applying position wherein said second bearing surface is closer to said first bearing surface, than in said raised position, and they cooperate to apply a greater pressure to the film unit to locate it at said exposure position;

means for biasing said pressure plate assembly toward said raised position;

means for releasably latching said pressure plate assembly in said lowered position including a pair of latch members mounted on said cover section for movement between latching and unlatching positions;

means for biasing said latch members toward their respective latching positions; and means on said pressure plate assembly for releasably holding said latch members in their said unlatching positions against the bias of said latch member biasing means when said pressure plate is in said raised position, for releasing said latch members for automatic movement to their said latching positions in response to movement of said pressure plate assembly to said lowered position, and thereafter responsive to movement of said latch members back to their said unlatching positions and the automatic movement of said pressure plate assembly back to said raised position caused thereby for again releasably holding said latching members in their said unlatching positions.

2. The cassette of claim 1 wherein each said latch member includes at least one tab that extends into said aperture and engagingly overlies said exterior surface of said pressure plate assembly when said assembly is in said lowered position and said latch members are in said latching position.

3. The cassette of claim 2 wherein said means on said pressure plate includes a pair of detents which extend below said exterior surface thereof and are positioned thereon to receive said corresponding tabs when said latch members are in said unlatching positions and said pressure plate assembly is in raised position to block movement of said latch members toward said latching positions by said latch member biasing means.

4. The cassette of claim 3 wherein said tabs and detents are visible to an operator when looking at said cover section of said cassette.

5. The cassette of claim 3 wherein said base and cover sections each include a pair of corresponding side wall portions which are disposed in facing relation when said cassette is in said closed position and said latch members are mounted in said side wall portions of said cover section for sliding motion between said latching and unlatching positions.

6. The cassette of claim 5 wherein said latch members have said tabs integrally formed therewith and said latch member biasing means includes a single spring mounted on said cover section and extending between its said side wall portions for engaging trailing end portions of said pair of latch members to apply a biasing force thereto.

7. The cassette of claim 6 further including means for connecting leading end portions of said latch members for simultaneous movement between said latching and unlatching positions.

8. The cassette of claims 1, 2, 3, 4, 5, 6 or 7 wherein said pressure plate assembly includes an intensifying screen having one side thereof which serves as said second bearing surface.

9. The cassette of claim 1 wherein it is configured for use with a large format film processing system having a cassette receiving tray with a pair of stops at the leading end thereof and said cassette further includes a release bar coupling said latch members together and being movable between an extended position when said latch members are in said latching positions and a retracted position when said latch members are in said unlatching positions and said release bar includes means thereon for engaging the stops on the tray for effecting movement of said release bar from said extended position to said retracted position in response to advancing said cassette into a fully-inserted position in the tray.

* * * * *